(12) United States Patent
Mirdha et al.

(10) Patent No.: US 11,859,995 B2
(45) Date of Patent: Jan. 2, 2024

(54) USER PREVIEW OF RIDESHARE SERVICE VEHICLE SURROUNDINGS

(71) Applicant: GM Cruise Holdings LLC, San Francisco, CA (US)

(72) Inventors: Aakanksha Mirdha, San Francisco, CA (US); Ajay Alfred, San Francisco, CA (US); Alexander Willem Gerrese, San Francisco, CA (US); Grace Noh, San Francisco, CA (US); Jeremy Stephen Juel, San Francisco, CA (US); Swarnakshi Kapil, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 17/563,435

(22) Filed: Dec. 28, 2021

(65) Prior Publication Data
US 2023/0116185 A1    Apr. 13, 2023

Related U.S. Application Data

(63) Continuation of application No. 17/491,347, filed on Sep. 30, 2021.

(51) Int. Cl.
| | |
|---|---|
| *G06T 11/00* | (2006.01) |
| *G01C 21/36* | (2006.01) |
| *G06F 9/451* | (2018.01) |
| *H04N 7/18* | (2006.01) |
| *G01C 21/34* | (2006.01) |
| *B60W 60/00* | (2020.01) |

(Continued)

(52) U.S. Cl.
CPC ...  *G01C 21/3647* (2013.01); *B60W 60/00253* (2020.02); *G01C 21/3461* (2013.01); *G01C 21/3635* (2013.01); *G06F 9/451* (2018.02); *G06T 11/00* (2013.01); *G06V 20/56* (2022.01); *H04N 7/185* (2013.01); *G01S 13/89* (2013.01); *G01S 17/89* (2013.01); *G06T 2200/04* (2013.01); *G06T 2200/24* (2013.01)

(58) Field of Classification Search
CPC .. G06T 11/00; G06T 2200/24; G06T 2200/04
See application file for complete search history.

(56) References Cited

U.S. PATENT DOCUMENTS

| | | | |
|---|---|---|---|
| 10,549,690 B1 | 2/2020 | Englander et al. | |
| 2014/0258405 A1* | 9/2014 | Perkin .................... | H04W 4/21 709/204 |

(Continued)

FOREIGN PATENT DOCUMENTS

| | | |
|---|---|---|
| DE | 102017101494 A1 | 7/2017 |
| WO | 2019165451 A1 | 8/2019 |

OTHER PUBLICATIONS

EN Translation of DE102017101494 A1, 43 pages.

*Primary Examiner* — Samantha (Yuehan) Wang
(74) *Attorney, Agent, or Firm* — Akona IP PC (57) ABSTRACT

A designated location preview method includes obtaining an image of a portion of an environment of a vehicle dispatched to a designated location in response to a service request from a user, wherein the obtaining is performed using at least one onboard sensor of the vehicle; and displaying the image of the environment portion on a user interface (UI) of a user device substantially in real-time.

20 Claims, 7 Drawing Sheets

(51) Int. Cl.
  *G06V 20/56*  (2022.01)
  *G01S 13/89*  (2006.01)
  *G01S 17/89*  (2020.01)

(56) References Cited

U.S. PATENT DOCUMENTS

| | | | |
|---|---|---|---|
| 2016/0050356 A1* | 2/2016 | Nalepka | H04N 23/62 |
| | | | 348/148 |
| 2016/0071418 A1 | 3/2016 | Oshida et al. | |
| 2017/0123423 A1 | 5/2017 | Sako et al. | |
| 2018/0211541 A1 | 7/2018 | Rakah et al. | |
| 2018/0275661 A1 | 9/2018 | Glaser | |
| 2018/0357824 A1* | 12/2018 | Wu | G06T 19/006 |
| 2019/0137290 A1 | 5/2019 | Levy et al. | |
| 2020/0071967 A1 | 3/2020 | Adams et al. | |
| 2020/0098201 A1 | 3/2020 | Reibling et al. | |
| 2020/0213560 A1 | 7/2020 | Zhang et al. | |
| 2021/0181736 A1 | 6/2021 | Reda et al. | |
| 2021/0192864 A1 | 6/2021 | McKnew et al. | |
| 2021/0394793 A1 | 12/2021 | Austin et al. | |
| 2022/0063689 A1* | 3/2022 | Kumar | B64D 47/08 |
| 2022/0119005 A1* | 4/2022 | Gerrese | G05D 1/0276 |
| 2022/0194409 A1 | 6/2022 | Koga | |
| 2022/0327651 A1* | 10/2022 | Trim | G06Q 50/30 |

\* cited by examiner

USER PREVIEW OF RIDESHARE SERVICE VEHICLE SURROUNDINGS

CROSS-REFERENCE TO RELATED APPLICATION

This application claims the benefit of and priority from U.S. patent application Ser. No. 17/491,347, filed Sep. 30, 2021, entitled "USER PREVIEW OF RIDESHARE SERVICE VEHICLE SURROUNDINGS", incorporated herein by reference in its entirety.

TECHNICAL FIELD OF THE DISCLOSURE

The present disclosure relates generally to rideshare services and, more specifically, to devices and methods for enabling a rideshare user to preview vehicle surroundings at a pickup location in connection with a rideshare service.

BACKGROUND

Individuals who use autonomous vehicle (AV) rideshare and delivery services late at night may feel uncomfortable or unsafe walking to and/or waiting for their vehicle in an unfamiliar pickup location, especially at night or when the designated pickup location is in an area with too little (or too much) traffic or is not well-lit, for example. Access to real-time information about a designated pickup location could increase perceived and/or actual safety of the rideshare or delivery service user.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS OF THE DISCLOSURE

Overview

The systems, methods, and devices of this disclosure each have several innovative aspects, no single one of which is solely responsible for all of the desirable attributes disclosed herein. Details of one or more implementations of the subject matter described in this specification are set forth in the description below and the accompanying drawings.

As described herein, a PLP system may include a user application, or "app" that enables a rideshare service user to preview the surroundings of a vehicle, such as an AV, as it approaches and/or arrives at a designated pickup location using the AV's onboard cameras, Light Detection and Ranging (LIDAR) system, Radio Detection and Ranging (RADAR) system, and/or other onboard sensor modalities. The user app may also enable the rideshare service user to preview a route from a current location of the user to the designated pickup location, again using the vehicle's onboard cameras, LIDAR system RADAR, system, and/or other onboard sensor modalities, as well as current and historical camera and sensor data from other AVs in a fleet. Using the preview functionality, the user is able to determine whether he or she feels comfortable proceeding to the vehicle at the designated pickup location or to initiate selection of an alternative pickup location.

In accordance with features of embodiments described herein, real-time three-dimensional (3D) camera and sensor image data may be streamed from the vehicle to the user app on a user device, such as a mobile phone or tablet, and presented as a preview, which may include videos and/or still images. The preview presented on the user app may be manipulated by the user both spatially and temporally as desired to enable the user to virtually explore, in real-time, the surroundings of the pickup location. In certain embodiments, a UI overlay highlighting people and other objects of interest identified using 3D camera, RADAR, and LIDAR image data may be provided to assist the user in identifying people and objects in and around the pickup location. In certain embodiments, the PLP system includes an opt-in monitoring and notification feature that continuously monitors the vehicle's surroundings and notifies the user (via the user app) when the PLP system determines it is safe for the user to proceed toward the vehicle. In other embodiments, the PLP system includes a safer pickup location identification feature that automatically searches for and identifies locations meeting certain safety criteria, which may include default criteria or criteria identified by the user as lending to a feeling of safety. The PLP system may also include features that enable the user to extend the pickup time to provide the user additional time to assess the safety of the pickup location using the preview functionality and that enable the user to change the pickup location.

In certain embodiments, the PLP system may process images collected by a fleet of AVs to identify recent and/or relevant video and still images of the pickup location and a route from the user's current location to the pickup location. Additionally, in certain embodiments, a UI of the user app of the PLP system may combine 3D live video stream and 3D images to enable users to transition seamlessly between viewing 360-degree video to 360-degree images as desired.

Embodiments of the present disclosure provide a designated pickup location preview method including obtaining an image of a portion of an environment of a vehicle dispatched to a designated pickup location in response to a service request from a user, wherein the obtaining is performed using at least one onboard sensor of the vehicle, and displaying the image of the environment portion on a UI of a user device substantially in real-time.

Embodiments further include a pickup location preview method including obtaining an image of an environment of an AV dispatched to a designated pickup location in response to a service request from a user, wherein the obtaining is performed using at least one onboard sensor of the vehicle, determining that the designated pickup location is unsafe based and that an alternative pickup location is safe based at least in part on the image, and notifying the user of the alternative pickup location.

Embodiments further include a location preview system including a vehicle comprising at least one onboard sensor for generating a live image of an environment of the vehicle when the vehicle is dispatched to a designated pickup location in response to a service request by a user, and a preview control module for providing the generated live image to a device of the user, the generated live image being displayed on a UI of the user device, wherein the user can manipulate a view of the live image generated by the at least one onboard sensor using the UI.

As will be appreciated by one skilled in the art, aspects of the present disclosure, in particular aspects of a PLP system for rideshare services described herein, may be embodied in various manners (e.g., as a method, a system, an AV, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Environment for AV Rideshare Services

Figure 1:
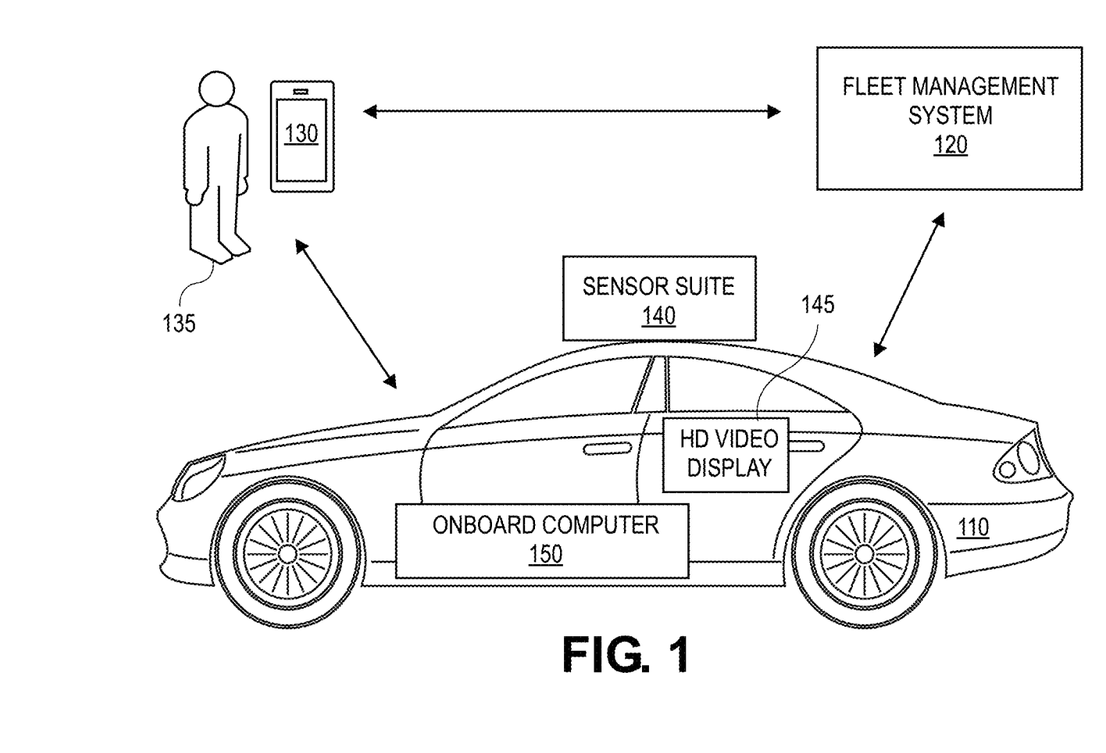
FIG. 1 is a block diagram illustrating an environment including an example AV for implementing aspects of an example pickup location preview (PLP) system for an AV rideshare service according to some embodiments of the present disclosure.

FIG. 1 is a block diagram illustrating an environment 100 including an AV 110 that can be used to provide rideshare services, which may include delivery services as well as human passenger transportation services, to a user according to some embodiments of the present disclosure. In particular, the environment 100 may comprise a PLP system, as will be described in greater detail below. The environment 100 includes an AV 110, a fleet management system 120, and a user device 130. The AV 110 may include a sensor suite 140 and an onboard computer 150. The fleet management system 120 may manage a fleet of AVs that are similar to AV 110; one or more of the other AVs in the fleet may also include a sensor suite and onboard computer. The fleet management system 120 may receive service requests for the AVs 110 from user devices 130. For example, a user 135 may make a request for rideshare service using an application, or "app," executing on the user device 130. The user device 130 may transmit the request directly to the fleet management system 120. In the case of a delivery service, the user device 130 may also transmit the request to a separate service (e.g., a service provided by a grocery store or restaurant) that coordinates with the fleet management system 120 to deliver orders to users. The fleet management system 120 dispatches the AV 110 to carry out the service requests. When the AV 110 arrives at a pickup location (i.e., the location at which user is to meet the AV to begin the rideshare service or to retrieve his or her delivery order), the user may be notified by the app to meet the AV.

The AV 110 is preferably a fully autonomous automobile, but may additionally or alternatively be any semi-autonomous or fully autonomous vehicle; e.g., a boat, an unmanned aerial vehicle, a self-driving car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which may include a computer vision ("CV") system, localization sensors, and driving sensors. For example, the sensor suite 140 may include photodetectors, cameras, RADAR, LIDAR, Sound Navigation and Ranging (SONAR), Global Positioning System (GPS), wheel speed sensors, inertial measurement units (IMUS), accelerometers, microphones, strain gauges, pressure monitors, barometers, thermometers, altimeters, etc. The sensors may be located in various positions in and around the AV 110. For example, the sensor suite 140 may include multiple cameras mounted at different positions on the AV 110, including within the main cabin for passengers and/or deliveries. A high definition (HD) video display 145 may be provided on an exterior of the AV 110 for displaying HD video images, for purposes that will be described hereinbelow.

An onboard computer 150 may be connected to the sensor suite 140 and the HD video display 145 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. In addition, the onboard computer 150 controls various aspects of the functionality of the HD video display 145, including display of video thereon.

The onboard computer 150 is preferably a general-purpose computer adapted for I/O communication with vehicle control systems and sensor suite 140 but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems. Aspects of the onboard computer 150 are described in greater detail with reference to FIG. 3.

The fleet management system 120 manages the fleet of AVs, including AV 110. The fleet management system 120 may manage one or more services that provide or use the AVs, e.g., a service for providing rides to users with the AVs, or a service that delivers items, such as prepared foods, groceries, or packages, using the AVs. The fleet management system 120 may select an AV from the fleet of AVs to perform a particular service or other task and instruct the selected AV to autonomously drive to a particular location (e.g., a designated pickup location) to pick up a user and/or drop off an order to a user. The fleet management system 120 may select a route for the AV 110 to follow. The fleet management system 120 may also manage fleet maintenance tasks, such as charging, servicing, and cleaning of the AV. As shown in FIG. 1, the AV 110 communicates with the fleet management system 120. The AV 110 and fleet management system 120 may connect over a public network, such as the Internet. The fleet management system 120 is described in greater detail with reference to FIG. 4.

Example UI for PLP System

FIGS. 2A-2F illustrate various aspects of an example UI 400 of a user app for a PLP system, such as the PLP system of environment 100 (FIG. 1), according to embodiments described herein. As shown in FIGS. 2A-2F, the UI 400 may be displayed on a touch-enabled display device of a mobile device 402, which in the illustrated embodiment includes a mobile phone. It will be recognized that the UI 400 may be used by a user to interact with user app to initiate a rideshare request. As previously noted, the rideshare request may be a request for transportation of a passenger or request for delivery of an item, such as a grocery or restaurant order. The rideshare request includes a designated pickup location, which as defined herein includes a location at which the passenger is to be picked up by an AV dispatched by the fleet management system or a location from which the user is to pick up the item being delivered from the AV dispatched by the fleet management system.

Figure 2A:
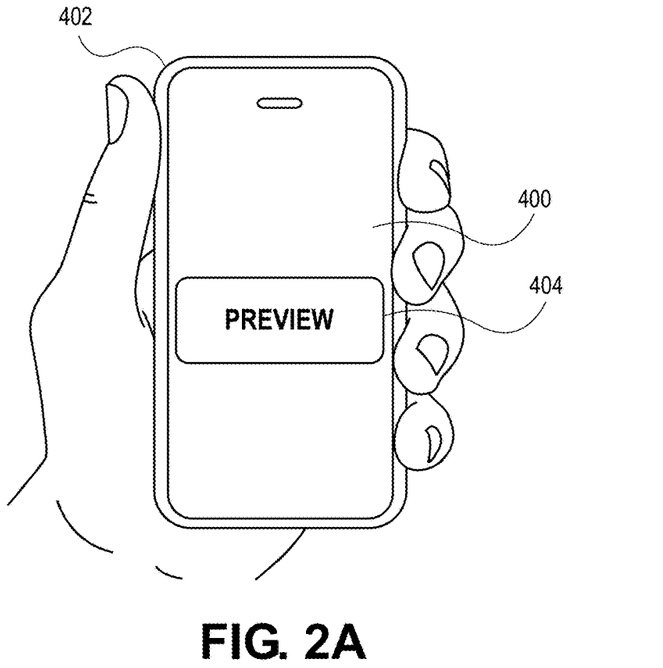
FIGS. 2A-2F illustrate various aspects of a user interface (UI) of an example PLP system for an AV rideshare service according to some embodiments of the present disclosure.

As shown in FIG. 2A, when the AV is within a certain distance of the designated pickup location (e.g., 0.25 miles), a PREVIEW button 404 is displayed on the UI 400. It will be recognized that the distance from the designated pickup location that triggers display of the PREVIEW button 404 may be a default distance between the AV and the designated pickup location. Alternatively, the distance from the designated pickup location that triggers display of the PREVIEW button 404 may be configured as a preference in a user profile of the user in connection with the rideshare service in general and the PLP system in particular. Still further, instead of being triggered by a distance from the designated pickup location, display of the PREVIEW button 404 may be triggered by an estimated arrival time falling below a default or user-configured threshold amount of time (e.g., 5 minutes to arrival).

Figure 2B:
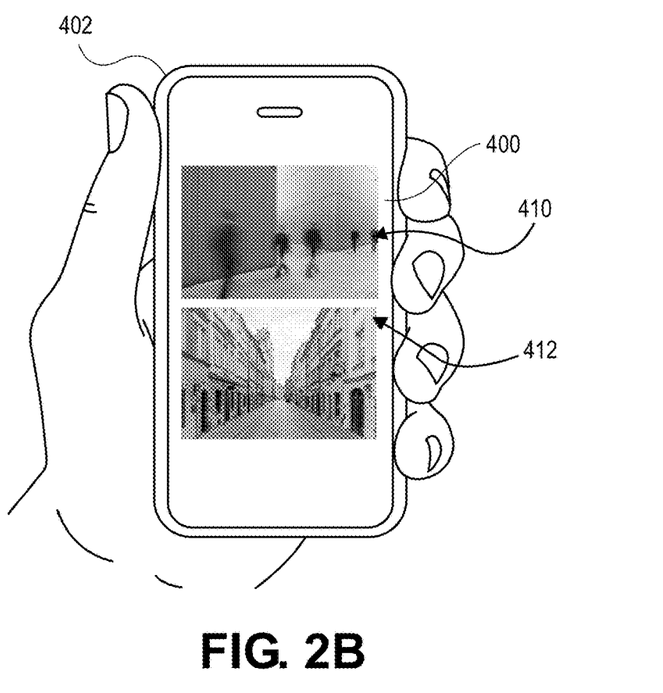

Referring to FIGS. 2A and 2B, selection of the PREVIEW button 404 by the user results initiation of a preview functionality of the PLP system, which includes presentation of one or more videos and/or still images of the surroundings of the AV, represented in FIG. 2B by images 410, 412, on the UI 200. In particular embodiments, the videos and/or images 410, 412, include an interactive, live (i.e., substantially real-time) 3D video and/or images of the surroundings of the vehicle. In certain embodiments, the images may be accompanied by live audio of the surroundings of the vehicle captured by one or more microphones included in the sensor suite. The particular view shown in the video and/or images may be changed and the surroundings navigated by the user by moving the user device 402 in 3D space or by using touchscreen functions, such as "swiping" or using arrow buttons, for example, or other functions. The preview displayed using the UI 400 may provide the user with a real-time video stream and/or still images of the vehicle's surroundings comprising the designated pickup location (and/or the route to the designated pickup location if the vehicle has not yet arrived). In certain embodiments, CV models, paired with RADAR and LIDAR data, may be used to identify and highlight moving objects and people in proximity to the vehicle using, for example, an overlay on the displayed images. Using the preview functionality, the user may determine whether he or she feels safe proceeding to the designated pickup location.

Figure 2C:
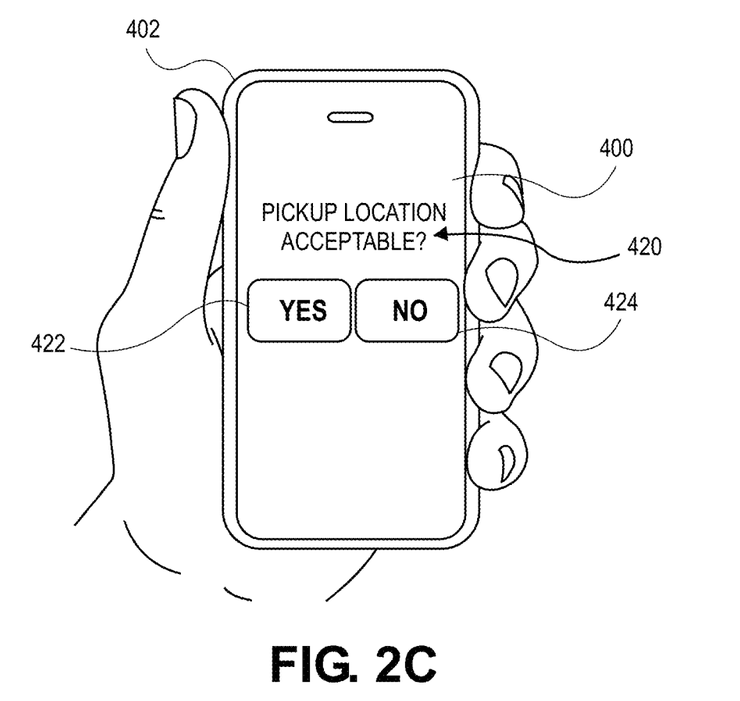

Referring now to FIG. 2C, when the AV arrives at the designated pickup location, a prompt 420 may be displayed on the UI 400 to query the user whether the designated pickup location is acceptable, for example, based on the user's assessment of the surroundings using of the preview video(s) and/or image(s) (FIG. 2B). The user may indicate his or her approval or disapproval of the pickup location by respectively selecting a YES button 422 or a NO button 424.

Figure 2D:
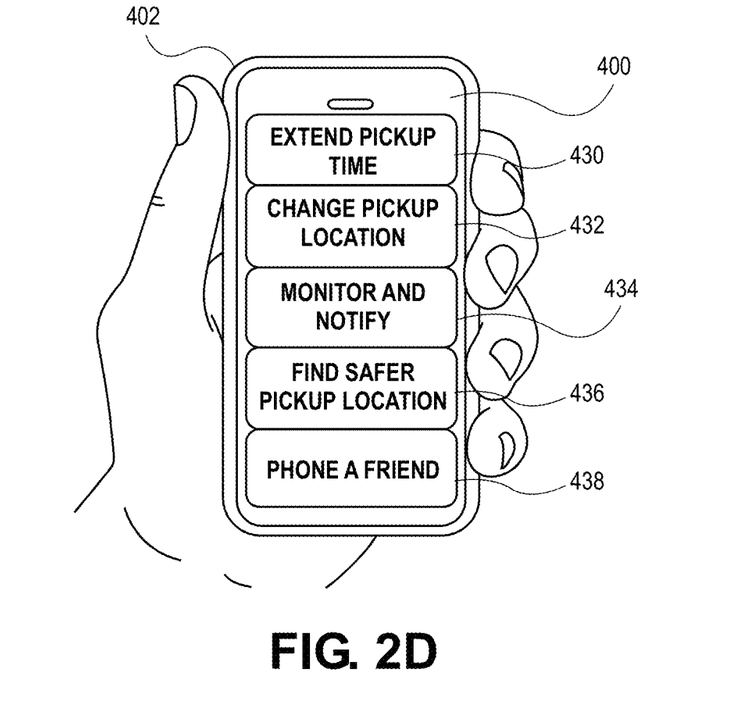

Referring now to FIG. 2D, if the user indicates with his or her selection of the NO button 424 that the pickup location is not acceptable, the user may be presented with a number of alternatives corresponding to enhanced features, or options, from among which to select. Such enhanced features may include one or more of an Extend Pickup Time feature 430, a Change Pickup Location feature 432, a Monitor and Notify feature 434, a Find Safer Pickup Location feature 436, and a Phone a Friend feature 438. Each of these features will be described in further detail below.

The Extend Pickup Time feature 430 enables the user to extend the amount of time the vehicle will wait before departing the designated pickup location. This feature effectively allows the user to continuously monitor the surroundings at the pickup location via the preview functionality without time pressure and to elect to proceed to the pickup location when the user feels safe in doing so. Upon expiry of the first extension of time, the user may be prompted to select additional extensions of time (up to a limited or unlimited number of extensions) until he or she feels comfortable proceeding to the vehicle or until the requested rideshare service is ultimately canceled.

The Change Pickup Location 432 feature enables the user to designate an entirely new (i.e., safer) pickup location, such as one located on a more well-lit side of a building or in an area known to have more pedestrian traffic. The new pickup location may be selected using the preview functionality to observe and assess areas close to the currently designated pickup location to select what appears to be a safer pickup location. Other data may be provided by this feature, including annotated (or semantically labeled) map data and/or data from a fleet management system, for example, to enable the user to select a new pickup location.

The Monitor and Notify feature 434 enables the user to request the PLP system to continue monitoring the surroundings at the designated pickup location and to notify the user via the UI 400 when the surroundings appear safer. This feature leverages input from various onboard-vehicle sensors to continuously monitor the vehicle's surroundings and identify when it is safe for the user to proceed to the vehicle, at which time the user will be provided with a notification via the UI 400.

The Find a Safer Pickup Location feature 436 enables the user to request the vehicle to search for a safer pickup location. When this option is selected, the vehicle may begin to drive around the area proximate the designated pickup location (e.g., around the block) searching for a safer pickup location (e.g., a location that is more well-lit and has higher pedestrian traffic). In one embodiment, when the vehicle arrives at a location determined to be safe, the vehicle stops and the system notifies the user of the updated pickup location, as well as a route to the location. The user may also be provided with a preview of the new location and may be queried as to whether the new pickup location is acceptable, as shown in FIGS. 2A and 2B, for example. Alternatively, instead of relying on the vehicle to identify a safer pickup location, the user may be provided with a continuous live video and/or still images from the vehicle's sensors showing the vehicle's surroundings as the it traverses the area and may proactively notify the vehicle when it arrives at a location that the user deems safe.

The Phone a Friend feature 438 enables the user to initiate a video conference with a friend via the UI 400, which video conference is concurrently displayed on an external HD video display (e.g., HD video display 145 shown in FIG. 1) of the vehicle. This feature can function to ward off potential bad actors from the area, while simultaneously offering reassurance to the user by providing a virtual witness in the form of a trusted third party in the area.

In certain embodiments, the user may toggle among enhanced features 430-438 as desired until the user boards the vehicle. Additionally, the user may initiate the preview functionality at any time prior to boarding the vehicle.

In certain embodiments, the safety of a location may be assessed by the vehicle/PLP system (e.g., in connection with the Change Pickup Location, Monitor and Notify, and Find a Safer Pickup Location features) using a combination of live and historical video, images, and data and with reference to one or more of a variety of safety criteria, including but not limited to crime statistics, lighting, pedestrian traffic, automobile traffic, etc., which criteria may be quantified, combined, and/or weighted in a variety of manners to develop a safety score, for example, which may be compared to safety scores of other locations. One or more safety criteria, as well as one or more factors related to the safety criteria (e.g., relative weight, priority), may be default values. Additionally and/or alternatively, one or more of safety criteria, as well as one or more factors related to the safety criteria, may be explicitly selected or set by a user, e.g., as user preferences included in a user profile associated with the user.

After the user selects one of the enhanced features 430-438, the selected one of the enhanced features is initiated and a preview of the pickup location may again be provided to the user on the user app.

Figure 2E:
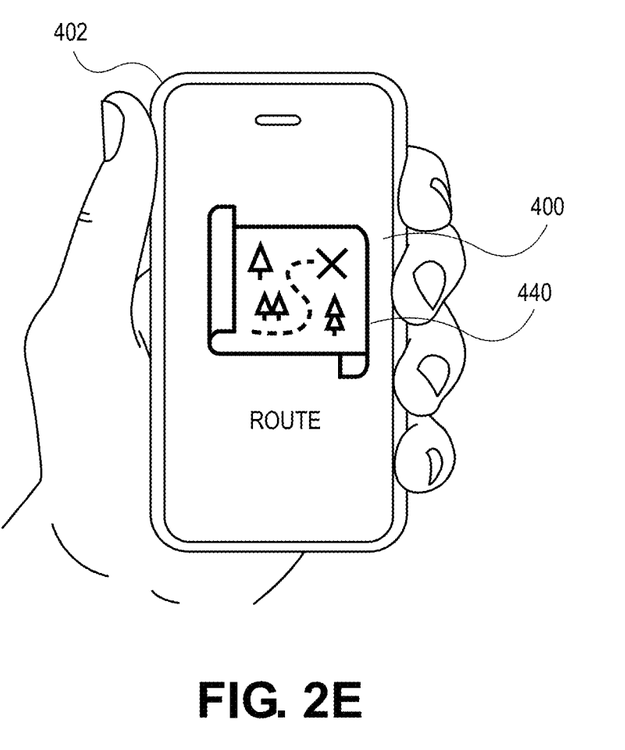

As represented in FIG. 2E, in some embodiments, once the user approves a pickup location, if the location is more than a specified distance (e.g., a block) from a current location of the user, additional preview options may be provided using the UI 400 to ensure the safety of the user en route to the pickup location. For example, sensor data recently acquired by the vehicle on the way to the pickup location may be used to provide additional information regarding the route to the pickup location from the user's current location. For example, recent CV/RADAR/LIDAR data of the route between the user's current location and the pickup location may be presented to the user on the UI 400, e.g., as represented by an image 440. In addition, helpful semantic labels, such as "well-lit," "low-crime," and "high pedestrian traffic," may be presented on a map showing the route between the user's current location and the pickup location. Still further, 3D images of the route may be provided to and manipulated by the user using the app, similar to the preview of the pickup location surroundings. It will be understood, however, that the route data may be several seconds to minutes old. In certain embodiments, the user may move spatially and temporally through the data, as the vehicle captures a continuous feed, enabling the user to swipe to move forward and/or backward through streets and may even access data from different times of the day to better understand typical conditions of the route (and pickup location).

Route information (including video, images, and other data) from the vehicle itself may be augmented using live or recently acquired route information (including video, images, and other data) from other vehicles in the fleet. Moreover, if even more additional route information is needed or desired, the vehicle can circle the area and capture the additional information while the user reviews the situation via the user app.

Figure 2F:
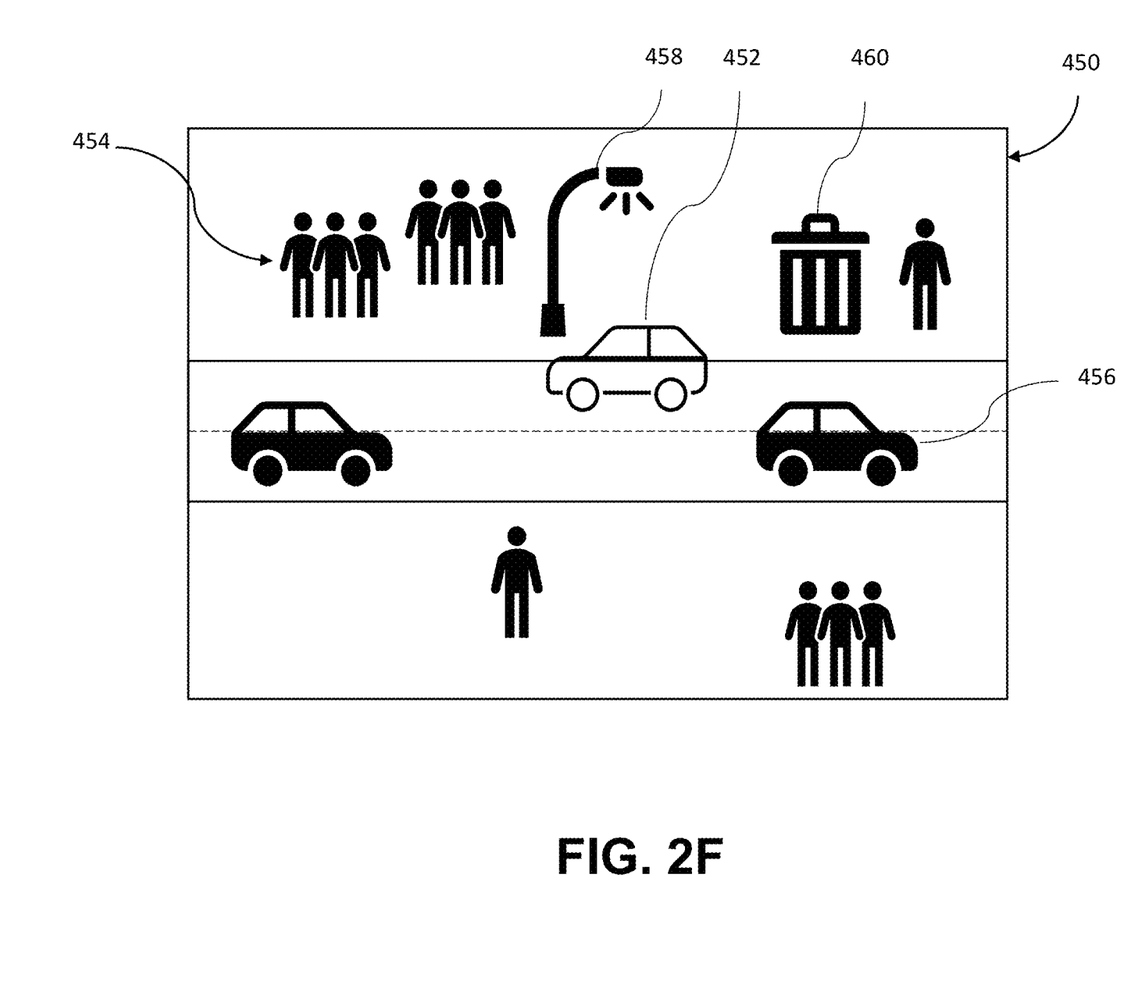

In certain embodiments, the user may be provided with generalized information regarding the pickup location based on live sensor data from the AV. Referring now to FIG. 2F, a 2D map 450 of the pickup location may be presented on the UI (not shown in FIG. 2F). An UI overlay is provided on the map 450 to indicate the location of the AV 452 as well as locations of various objects of potential interest to the user, such as pedestrians 454, other vehicles 456, street lights, such as a street light 458, and visual obstructions, such as a dumpster 460, relative to the AV 452. The objects and their locations relative to the AV may be identified using, for example, camera, LIDAR, and/or RADAR data from the sensor suite of the AV. One purpose of the overlay is to provide the user with information to make their own assessment as to the safety of the pickup location based on other objects in the area. In addition and/or alternatively to the overlay shown in FIG. 2F, text information denoting the type and number of objects within a certain distance of the pickup location (e.g., "4 pedestrians, 2 parked vehicles, 1 street light," etc.) may be provided to facilitate a safety assessment by the user. It should be noted that the icons in the FIGS. representing certain objects of interest may represent one or more detected objects of that type (e.g., each person icon may represent n people, etc.), which also helps to generalize the detailed information received by the AV.

Example Onboard Computer

Figure 3:
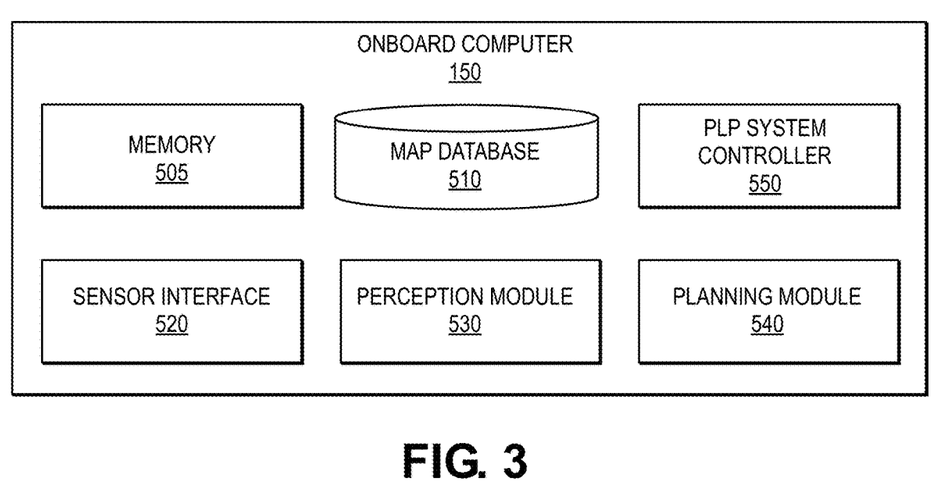
FIG. 3 is a block diagram illustrating an onboard computer for enabling aspects of an example PLP system for an AV rideshare service according to some embodiments of the present disclosure.

FIG. 3 is a block diagram illustrating an onboard computer 150 for enabling features according to some embodiments of the present disclosure. The onboard computer 150 may include memory 505, a map database 510, a sensor interface 520, a perception module 530, a planning module 540, and a PLP system controller 550. In alternative configurations, fewer, different and/or additional components may be included in the onboard computer 150. For example, components and modules for controlling movements of the AV 110 and other vehicle functions, and components and modules for communicating with other systems, such as the fleet management system 120, are not shown in FIG. 3. Further, functionality attributed to one component of the onboard computer 150 may be accomplished by a different component included in the onboard computer 150 or a different system from those illustrated.

The map database 510 stores a detailed map that includes a current environment of the AV 110. The map database 510 includes data describing roadways (e.g., locations of roadways, connections between roadways, roadway names, speed limits, traffic flow regulations, toll information, etc.) and data describing buildings (e.g., locations of buildings, building geometry, building types). The map database 510 may further include data describing other features, such as bike lanes, sidewalks, crosswalks, traffic lights, parking lots, etc.

The sensor interface 520 interfaces with the sensors in the sensor suite 140. The sensor interface 520 may request data from the sensor suite 140, e.g., by requesting that a sensor capture data in a particular direction or at a particular time. The sensor interface 520 is configured to receive data captured by sensors of the sensor suite 140. The sensor interface 520 may have subcomponents for interfacing with individual sensors or groups of sensors of the sensor suite 140, such as a thermal sensor interface, a camera interface, a lidar interface, a radar interface, a microphone interface, etc.

The perception module 530 identifies objects in the environment of the AV 110. The sensor suite 140 produces a data set that is processed by the perception module 530 to detect other cars, pedestrians, trees, bicycles, and objects traveling on or near a road on which the AV 110 is traveling or stopped, and indications surrounding the AV 110 (such as construction signs, traffic cones, traffic lights, stop indicators, and other street signs). For example, the data set from the sensor suite 140 may include images obtained by cameras, point clouds obtained by LIDAR sensors, and data collected by RADAR sensors. The perception module 530 may include one or more classifiers trained using machine learning to identify particular objects. For example, a multi-class classifier may be used to classify each object in the environment of the AV 110 as one of a set of potential objects, e.g., a vehicle, a pedestrian, or a cyclist. As another example, a human classifier recognizes humans in the environment of the AV 110, a vehicle classifier recognizes vehicles in the environment of the AV 110, etc.

The planning module 540 plans maneuvers for the AV 110 based on map data retrieved from the map database 510, data received from the perception module 530, and navigation information, e.g., a route instructed by the fleet management system 120. In some embodiments, the planning module 540 receives map data from the map database 510 describing known, relatively fixed features and objects in the environment of the AV 110. For example, the map data includes data describing roads as well as buildings, bus stations, trees, fences, sidewalks, etc. The planning module 540 receives data from the perception module 530 describing at least some of the features described by the map data in the environment of the AV 110. The planning module 540 determines a pathway for the AV 110 to follow. The pathway includes locations for the AV 110 to maneuver to, and timing and/or speed of the AV 110 in maneuvering to the locations.

The PLP system controller 550 interacts with the map database 510, sensor interface 520, and perception module 530 to control and provide various aspects of the PLP system functionality, including but not limited to providing preview functionality and other features as described above with reference to FIGS. 2A-2F and as described below with reference to FIG. 5.

Example Fleet Management System

Figure 4:
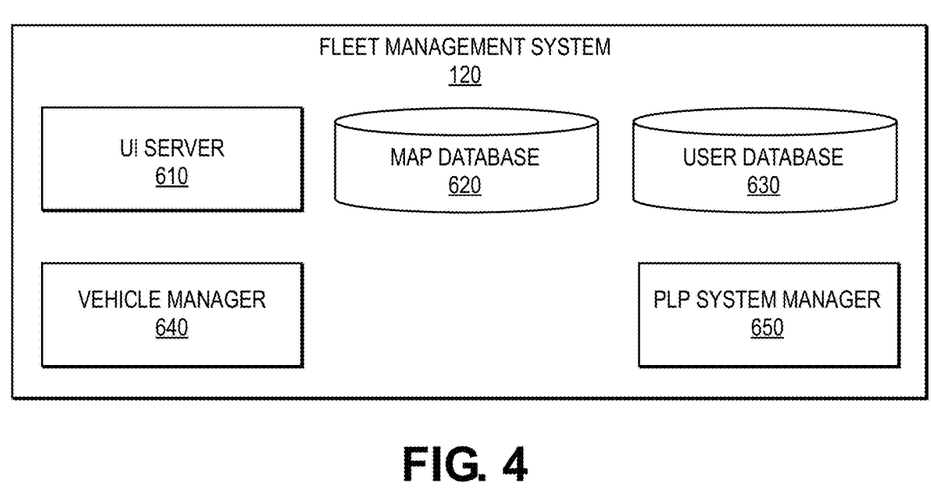
FIG. 4 is a block diagram of a fleet management system for enabling aspects of an example PLP system for an AV rideshare service according to some embodiments of the present disclosure.

FIG. 4 is a block diagram illustrating the fleet management system 120 according to some embodiments of the present disclosure. The fleet management system 120 includes a UI server 610, a map database 620, a user database 630, a vehicle manager 640, and a PLP system manager 650. In alternative configurations, different, additional, or fewer components may be included in the fleet management system 120. Further, functionality attributed to one component of the fleet management system 120 may be accomplished by a different component included in the fleet management system 120 or a different system than those illustrated.

The UI server 610 is configured to communicate with client devices that provide a user interface to users. For example, the UI server 610 may be a web server that provides a browser-based application to client devices, or the UI server 610 may be a user app server that interfaces with a user app installed on client devices, such as the user device 130. The UI enables the user to access a service of the fleet management system 120, e.g., to request a ride from an AV 110, or to request a delivery from an AV 110. For example, the UI server 610 receives a request for a ride that includes an origin location (e.g., the user's current location) and a destination location, or a request for a delivery that includes a pickup location (e.g., a local restaurant) and a destination location (e.g., the user's home address). In accordance with features of embodiments described herein, UI server 610 may communicate information to a user regarding various aspects of the PLP system functionality, including but not limited to providing preview functionality and other features as described above with reference to FIGS. 2A-2F and as described below with reference to FIG. 5.

The map database 620 stores a detailed map describing roads and other areas (e.g., parking lots, AV service facilities) traversed by the fleet of AVs 110. The map database 620 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc. At least a portion of the data stored in the map database 620 is provided to the AVs 110 as a map database 510, described above.

The user database 630 stores data describing users of the fleet of AVs 110. Users may create accounts with the fleet management system 120, which stores user information associated with the user accounts, or user profiles, in the user database 630. The user information may include identifying information (name, user name), password, payment information, home address, contact information (e.g., email and telephone number), and information for verifying the user (e.g., photograph, driver's license number). Users may provide some or all of the user information, including user preferences regarding certain aspects of services provided by the rideshare system, to the fleet management system 120. In some embodiments, the fleet management system 120 may infer some user information from usage data or obtain user information from other sources, such as public databases or licensed data sources.

The fleet management system 120 may learn one or more home addresses for a user based on various data sources and user interactions. The user may provide a home address when setting up his account, e.g., the user may input a home address, or the user may provide an address in conjunction with credit card information. In some cases, the user may have more than one home, or the user may not provide a home address, or the user-provided home address may not be correct (e.g., if the user moves and the home address is out of date, or if the user's address associated with the credit card information is not the user's home address). In such cases, the fleet management system 120 may obtain a home address from one or more alternate sources. In one example, the fleet management system 120 obtains an address associated with an official record related to a user, such as a record from a state licensing agency (e.g., an address on the user's driver's license), an address from the postal service, an address associated with a phone record, or other publicly available or licensed records. In another example, the fleet management system 120 infers a home address based on the user's use of a service provided by the fleet management system 120. For example, the fleet management system 120 identifies an address associated with at least a threshold number of previous rides provided to a user (e.g., at least 10 rides, at least 50% of rides, or a plurality of rides), or at least a threshold number of previous deliveries (e.g., at least five deliveries, at least 60% of deliveries) as a home address or candidate home address. The fleet management system 120 may look up a candidate home address in the map database 620 to determine if the candidate home address is associated with a residential building type, e.g., a single-family home, a condominium, or an apartment. The fleet management system 120 stores the identified home address in the user database 630. The fleet management system 120 may obtain or identify multiple addresses for a user and associate each address with the user in the user database 630. In some embodiments, the fleet management system 120 identifies a current home address from multiple candidate home addresses, e.g., the most recent address, or an address that the user rides to or from most frequently and flags the identified current home address in the user database 630.

The vehicle manager 640 directs the movements of the AVs 110 in the fleet. The vehicle manager 640 receives service requests from users from the UI server 610, and the vehicle manager 640 assigns service requests to individual AVs 110. For example, in response to a user request for transportation from an origin location to a destination location, the vehicle manager 640 selects an AV and instructs the AV to drive to the origin location (e.g., a passenger or delivery pickup location), and then instructs the AV to drive to the destination location (e.g., the passenger or delivery destination location). In addition, the vehicle manager 640 may instruct AVs 110 to drive to other locations while not servicing a user, e.g., to improve geographic distribution of the fleet, to anticipate demand at particular locations, to drive to a charging station for charging, etc. The vehicle manager 640 also instructs AVs 110 to return to AV facilities for recharging, maintenance, or storage.

The PLP system manager 650 manages various aspects of PLP system services performed by an AV as described herein, including but not limited to providing data and information for supporting preview functionality and other features as described above with reference to FIGS. 2A-2F and as described below with reference to FIG. 5.

Example Methods for Pickup Location Preview System Implementation and Operation

Figure 5:
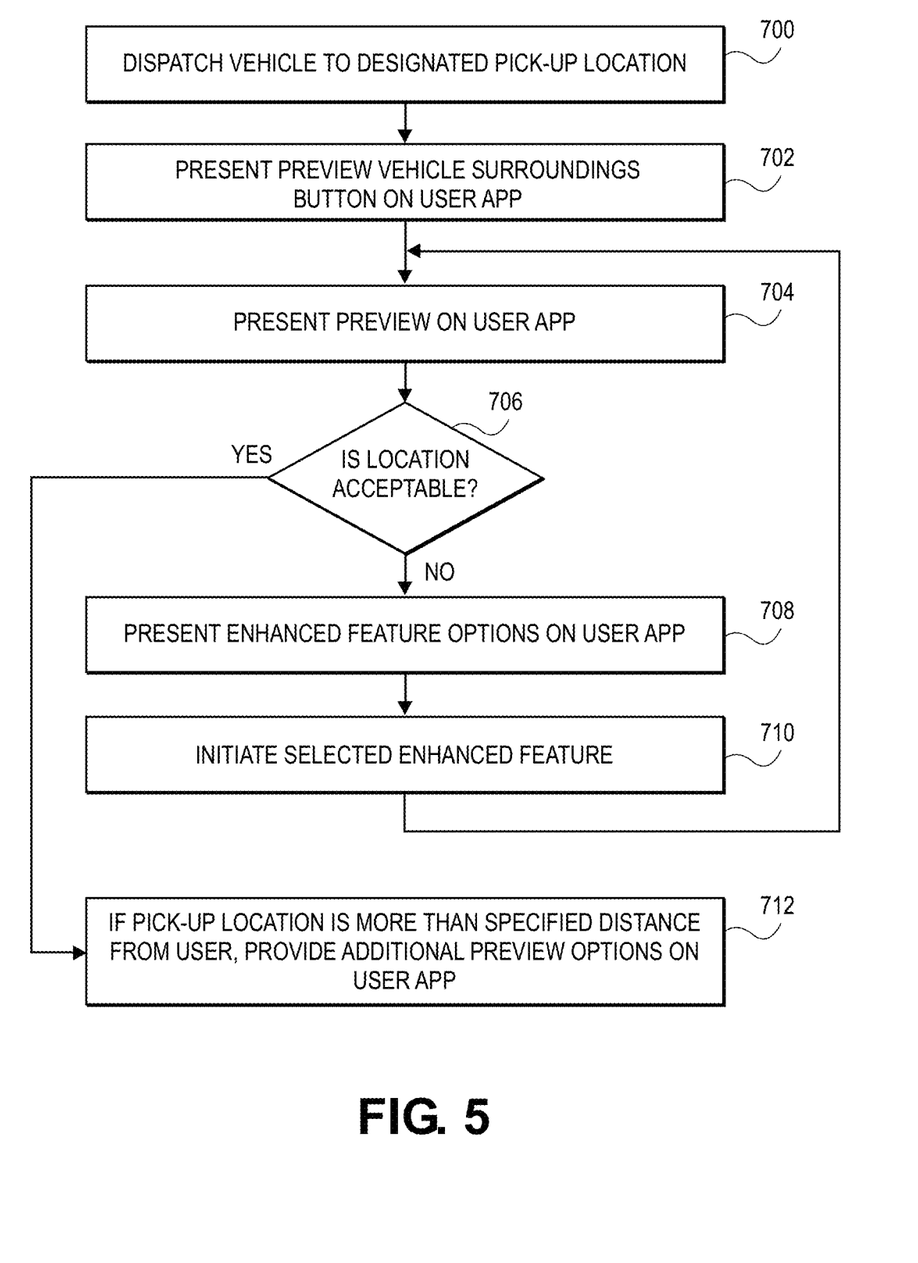
FIG. 5 is a flowchart illustrating an example method of a PLP system for an AV rideshare service according to some embodiments of the present disclosure.

FIG. 5 is a flowchart illustrating an example process for implementing and operating a PLP system for an AV rideshare service according to some embodiments of the present disclosure. One or more of the steps illustrated in FIG. 5 may be executed by one or more of the elements shown in FIGS. 3 and 4.

In step 700, in response to a request from a user (e.g., using an app on a user device), a vehicle is dispatched (e.g., by fleet management system 120) to a designated pickup location. The designated pickup location may be a location explicitly specified by the user (e.g., using the app) or may be a location identified to be proximate to the location specified by the user. Additionally and/or alternatively, the pickup location may be automatically designated based on a current location of the user.

In step 702, a PREVIEW button (or link) may be displayed to the user using the user app (e.g., as shown in FIG. 2A). In particular embodiments, the PREVIEW button is automatically displayed on the user app when the vehicle approaches the designated pickup location.

In step 704, after the user selects the PREVIEW button, a preview of the vehicle's surroundings is presented to the user using the user app (e.g., as shown in FIG. 2B). In particular embodiments, the preview includes an interactive, live 3D video and/or 3D images of the surroundings of the vehicle, which may be navigated by the user by moving the user device in 3D space or by using touchscreen functions, such as "swiping" or using arrow buttons, for example, or other functions. As described above, using the preview functionality, the user may determine whether he or she feels safe proceeding to the designated pickup location. In certain embodiments, live audio may be provided along with the live 3D video and/or 3D images. In a particular embodiment, the live (or substantially real-time) video, images, and/or audio may be communicated from the AV sensors to the fleet management system, which may communicate the video and/or audio to the user device (e.g., via a cellular communications network).

In step 706, the user is queried whether he or she feels safe proceeding to the designated pickup location. In an example embodiment, the user may be prompted to select "YES" or "NO" to indicate his or her response using the user app (e.g., as shown in FIG. 2C).

If in step 706, the user indicates that he or she does not feel safe proceeding to the designated pickup location (e.g., by selecting NO), execution proceeds to step 708, in which the user may select one or more enhanced features (e.g., as shown in FIG. 2D) to increase the user's perceived safety and/or comfort with the pickup location. As previously noted, in certain embodiments, available enhanced features may include one or more of an Extend Pickup Time feature, a Change Pickup Location feature, a Monitor and Notify feature, a Find Safer Pickup Location feature, and a Phone a Friend feature.

Once the user selects one of the enhanced features in step 710, the selected one of the enhanced features is initiated and a preview of the pickup location may once again be provided to the user on the user app (step 704). In certain embodiments, the user could set a preference in their user profile to automatically enable one or more of the enhanced features by default for services during particular hours of the day or under select circumstances. For example, the Find a Safer Pickup Location feature and/or Monitor and Notify feature could be enabled for any rides between the hours of 10 PM and 6 AM.

Once an acceptable location is determined (step 706), in step 712, if the pickup location is more than a specified distance (e.g., a block) from the user, additional preview options may be provided on the app to ensure the safety of the user en route to the pickup location.

Once the user determines that a pickup location and a route to the location are acceptably safe, the vehicle parks at the pickup location and awaits arrival of the user, who can continue to monitor the designated pickup location surroundings using the preview and other functionality of the user app and may revise his or her responses and feature selections indicative of his or her perceived safety at any time.

In various embodiments, location information (including 2D and 3D video and images and other data) from the vehicle itself may be augmented using live or recently acquired location information (including 2D and 3D video and images and other data) from other vehicles in the fleet. Moreover, if even more additional location information is needed or desired, the vehicle can circle the area and capture the additional information while the user reviews the situation via the user app. The availability of data from other vehicles increases the availability of recent, non-stale, data to provide a more accurate preview to the user.

Although the operations of the example method shown in FIG. 5 are illustrated as occurring once each and in a particular order, it will be recognized that the operations may be performed in any suitable order and repeated as desired. Additionally, one or more operations may be performed in parallel. Furthermore, the operations illustrated in FIG. 5 may be combined or may include more or fewer details than described.

It will be recognized that, although embodiments are described herein primarily with reference to passenger transportation services, they may also be advantageously applied to delivery services provided by AVs. Additionally, in addition to being applied in connection with pickup of a passenger and/or delivery of an item to a user, embodiments described herein may also be advantageously applied to drop off of a passenger and/or pickup of an item for delivery.

Select Examples

Example 1 provides a method including obtaining an image of a portion of an environment of a vehicle dispatched to a designated location in response to a service request from a user, in which the obtaining is performed using at least one onboard sensor of the vehicle and displaying the image of the environment portion on a UI of a user device substantially in real-time.

Example 2 provides the method of example 1, further including, in response to input from the user using the UI, obtaining an image of a different portion of the environment of the vehicle and displaying the image of the different environment portion on the UI substantially in real-time.

Example 3 provides the method of any of examples 1-2, in which the at least one onboard sensor includes at least one of a CV system, a camera, a LIDAR sensor, and a RADAR sensor.

Example 4 provides the method of any of examples 1-3, in which the image includes at least one of a three-dimensional (3D) video image and a 3D still image.

Example 5 provides the method of any of examples 1-4, in which the environment of the vehicle includes the designated location.

Example 6 provides the method of any of examples 1-5, in which displaying is performed after the vehicle is less than a predetermined distance from the designated location.

Example 7 provides the method of any of claims 1-6, in which the displaying is performed after an estimated arrival time of the vehicle at the designated location is within a predetermined amount of time.

Example 8 provides the method of any of examples 1-7, further including a safety of the designated location based at least in part on data including the image.

Example 9 provides the method of any of examples 1-8, further including notifying the user of the assessed safety of the designated location using the UI.

Example 10 provides the method of example 8, further including selecting a safer location than the designated location based at least in part on the data including the image and notifying the user of the selected safer location using the UI.

Example 11 provides the method of example 8 further including determining based on the assessing that the designated location is unsafe and causing the vehicle to traverse an area proximate the designated location to locate a safer alternative location using at least one onboard sensor of the vehicle.

Example 12 provides the method of any of examples 1-11, further including obtaining an image of a route between a current location of the user and the designated location, and displaying the route on the UI, in which the route image is obtained using at least one of the at least one onboard sensor of the vehicle and at least one onboard sensor of another vehicle.

Example 13 provides the method of example 12, further including displaying a map of the route on the UI, the map including at least one semantic label indicative of a safety condition of the route.

Example 14 provides the method of example 13, in which the safety condition includes at least one of lighting conditions, pedestrian traffic levels, crime statistics, and vehicle traffic.

Example 15 provides the method of any of examples 1-14, in which the vehicle includes an AV.

Example 16 provides the method of any of examples 1-15, further including prompting the user to initiate a video call with a third party and presenting the video call on a video display located on an external surface of the vehicle.

Example 17 provides the method of any of examples 1-16, in which the image displayed on the UI includes an overlay highlighting at least one object shown in the image.

Example 18 provides a method including obtaining an image of an environment of an AV dispatched to a designated location in response to a service request from a user, in which the obtaining is performed using at least one onboard sensor of the AV; determining that the designated location is unsafe and that an alternative location is safe based at least in part on the image; and notifying the user of the alternative location.

Example 19 provides the method of example 18, in which the notifying is displayed on a UI of a mobile device.

Example 20 provides the method of any of examples 18-19, further including determining that the designated location is safe based at least in part on the image and notifying the user that the designated location has been determined to be safe.

Example 21 provides the method of example 20, in which the notifying the user that the designated location has been determined to be safe is displayed on a UI of a mobile device.

Example 22 provides the method of any of examples 18-21, further including obtaining an image of a route between a current location of the user and the designated location and determining that the route is safe based at least in part on the route image and notifying the user that the route has been determined to be safe.

Example 23 provides the method of example 22, in which the route image is obtained using the at least one onboard sensor of the AV.

Example 24 provides the method of example 22, in which the AV includes one of a fleet of AVs, the route image is obtained using at least one onboard sensor of another AV of the fleet of AVs.

Example 25 a location preview system, including a vehicle including at least one onboard sensor for generating a live image of an environment of the vehicle when the vehicle is dispatched to a designated location in response to a service request by a user, and a preview control module for providing the generated live image to a device of the user, the generated live image being displayed on a UI of the user device, in which the user can manipulate a view of the live image generated by the at least one onboard sensor using the UI.

Example 26 provides the location preview system of example 25, in which the at least one onboard sensor includes at least one of a CV system, a camera, a LIDAR sensor, and a RADAR sensor.

Example 27 provides the location preview system of any of examples 25-26, in which the generated live image includes at least one of a three-dimensional (3D) video image and a 3D still image.

Example 28 provides the location preview system of any of examples 25-27, in which the vehicle includes an AV.

Example 29 provides the location preview system of any of examples claim 25-28, in which the vehicle further includes a video display on an external surface thereof.

Example 30 provides the location preview system of any of examples 25-29, in which the preview control module displays a video conference call between the user and a third party on the video display.

Example 31 provides the method of any of examples 1-17, in which the displayed image includes a two-dimensional (2D) map of the designated location, the method further including providing an overlay on the 2D map, the overlay identifying a location of the vehicle on the 2D map and a location and identity of at least one object at the designated location detected by the at least one onboard sensor of the vehicle.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this specification.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   subsequent to receiving a service request from a user, wherein the service request identifies a pickup location, and dispatching a first vehicle by a fleet management system to the pickup location, obtaining images of routes between a current location of the user and the pickup location;
   receiving the images at the fleet management system, the fleet management system transmitting the received images to a device of the user; and
   selectively displaying the images of the routes on a user interface (UI) of the user device substantially in real-time responsive to input from the user;
   wherein the route images are obtained using at least one of at least one onboard sensor controlled by an onboard computer of the first vehicle and onboard sensors controlled by onboard computers of a plurality of second vehicles comprising vehicles of a fleet of vehicles operating along the routes and connected to the fleet management system, wherein at least one of the second vehicles is located remotely from and operates independently from the first vehicle along the routes; and
   wherein the user selects one or more of the routes for which the images are displayed on the UI via the user device.

2. The method of claim 1, further comprising assessing safety conditions of the routes based at least in part on data comprising the images.

3. The method of claim 2, further comprising displaying maps of the routes on the UI, the maps including at least one annotation indicative of the safety conditions of the routes.

4. The method of claim 1, wherein the images comprise at least one of three-dimensional (3D) video images and 3D still images.

5. The method of claim 4, wherein the user can selectively transition between display of the 3D video images and display of the 3D still images.

6. The method of claim 1, wherein after arrival at the pickup location, the first vehicle remains at the pickup location for a designated time period, the method further comprising, subsequent to the displaying the images of the routes on the UI:
   prompting the user to indicate whether the user would like more time to meet the first vehicle at the pickup location;
   prompting the user to indicate an amount of time the user would like the first vehicle to wait for the user to meet the first vehicle; and
   subsequent to the user indicating that the user would like more time to meet the first vehicle at the pickup location, extending the designated time period the indicated amount of time.

7. The method of claim 1, further comprising displaying additional images of one of the routes selected by the user.

8. The method of claim 1, wherein, responsive to user input using the UI, selected portions of the selected route are displayed on the display to enable the user to examine the selected portions in greater detail.

9. A method comprising:
   obtaining at least one image of an environment of a first autonomous vehicle (AV) dispatched by a fleet management system to a designated pickup location in response to a service request from a user, wherein the obtaining is performed upon arrival of the first AV at the designated pickup location using at least one onboard sensor of the first AV under control of an onboard computer of the first AV;
   transmitting the at least one image from the onboard computer to the fleet management system;
   determining without human intervention that the designated pickup location is unsafe based at least in part on the at least one image;
   displaying the at least one image on a display of a user device of the user;
   notifying the user of the determination that the designed pickup location is unsafe; and
   monitoring the designated pickup location, wherein the monitoring further comprises:

obtaining additional images of the designated pickup location using the at least one onboard sensor of the first AV;

obtaining supplemental images of the designated pickup location using an onboard sensor controlled by an onboard controller of at least one second AV operating near the pickup location and connected to the fleet management system, wherein at least one second AV operates independently from the first AV; and determining based at least in part on the additional images and the supplemental images that the designated pickup location is no longer unsafe.

10. The method of claim 9, wherein the monitoring is performed subsequent to a request from the user to monitor the designated pickup location.

11. The method of claim 9, further comprising, subsequent to a determination that the designated pickup location is no longer unsafe, notifying the user that the designated pickup location is safe and to proceed to the designated pickup location.

12. The method of claim 11, wherein the notifying is displayed on a user interface (UI) of a mobile device.

13. The method of claim 9, further comprising transmitting the obtained at least one image from the fleet management system to a mobile device; and displaying the obtained at least one image on a user interface (UI) of the mobile device.

14. The method of claim 9, wherein the at least one onboard sensor of the vehicle comprises at least one of a computer vision (CV) system, a camera, a LIDAR sensor, and a RADAR sensor.

15. The method of claim 9, wherein the at least one image comprises at least one of a 360 degree video image and a 360 degree still image.

16. The method of claim 9, wherein the determining that the designated pickup location is unsafe is based at least in part on user preferences specified in a user profile of the user.

17. A method comprising:

obtaining at least one image of an environment of a first vehicle dispatched by a fleet management system to a designated pickup location in response to a service request from a user, wherein the obtaining is performed using at least one onboard sensor of the first vehicle under control of an onboard computer of the first vehicle, wherein the environment of the first vehicle comprises the designated pickup location;

transmitting the at least one image from the onboard computer to the fleet management system;

determining without human intervention that the designated pickup location is unsafe based at least in part on the at least one image;

notifying the user that the designated pickup location is unsafe;

displaying the at least one image to the user on a user interface (UI) of a user device; and identifying a safer alternative pickup location in an area proximate the designated pickup location, the identifying comprising:

causing the first vehicle to traverse the area proximate the designated pickup;

obtaining images of the area proximate the designated pickup location using the at least one onboard sensor of the first vehicle;

obtaining additional images of the area proximate the designated pickup location using an onboard sensor controlled by an onboard controller of at least one second vehicle traversing the area proximate the designated pickup location and connected to the fleet management system;

wherein the identifying the safer alternative pickup location is accomplished at least in part based on an analysis of the images and the additional images of the area proximate the designated pickup location.

18. The method of claim 17, wherein subsequent to identifying a safer alternative pickup location, notifying the user to meet the vehicle at the safer alternative pickup location.

19. The method of claim 17, further comprising:

obtaining at least one image of the safer alternative pickup location; and displaying the at least one image of the safer alternative pickup location on a user interface (UI) of a mobile device.

20. The method of claim 17, wherein the at least one onboard sensor of the vehicle comprises at least one of a computer vision (CV) system, a camera, a LIDAR sensor, and a RADAR sensor.

* * * * *